United States Patent
Hoban et al.

(10) Patent No.: US 9,063,758 B2
(45) Date of Patent: Jun. 23, 2015

(54) POPULATION OF DYNAMIC OBJECTS REPRESENTING STATIC NAMESPACE HIERARCHIES

(75) Inventors: Luke Hoban, Seattle, WA (US); Fiona Fung, Bellevue, WA (US); Harry Pierson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 464 days.

(21) Appl. No.: 13/171,153

(22) Filed: Jun. 28, 2011

(65) Prior Publication Data

US 2013/0007699 A1  Jan. 3, 2013

(51) Int. Cl.
*G06F 9/44* (2006.01)
*G06F 9/445* (2006.01)

(52) U.S. Cl.
CPC .............. *G06F 9/44521* (2013.01); *G06F 8/20* (2013.01); *G06F 9/443* (2013.01)

(58) Field of Classification Search
None
See application file for complete search history.

(56) References Cited

U.S. PATENT DOCUMENTS

| | | | | |
|---|---|---|---|---|
| 6,415,434 B1* | 7/2002 | Kind | | 717/107 |
| 6,446,253 B1* | 9/2002 | Mellmer | | 717/108 |
| 6,604,182 B1 | 8/2003 | Sexton et al. | | |
| 6,766,335 B2* | 7/2004 | Kukura et al. | | 717/108 |
| 7,065,742 B1* | 6/2006 | Bogdan | | 717/106 |
| 7,076,785 B2 | 7/2006 | Mishra et al. | | |
| 7,117,507 B2 | 10/2006 | Hostetter et al. | | |
| 7,130,863 B2* | 10/2006 | Diab | | 717/106 |
| 7,143,421 B2 | 11/2006 | Forin et al. | | |
| 7,155,705 B1* | 12/2006 | Hershberg et al. | | 717/137 |
| 7,219,329 B2* | 5/2007 | Meijer et al. | | 717/108 |
| 7,293,261 B1* | 11/2007 | Anderson et al. | | 717/136 |
| 7,349,913 B2* | 3/2008 | Clark et al. | | 717/116 |
| 7,434,157 B2* | 10/2008 | Little et al. | | 715/234 |
| 7,444,620 B2 | 10/2008 | Marvin | | |
| 7,454,743 B2* | 11/2008 | Fuchs | | 717/108 |
| 7,496,926 B2* | 2/2009 | Majumdar | | 719/315 |
| 7,546,226 B1* | 6/2009 | Yeh et al. | | 717/108 |
| 7,757,210 B1* | 7/2010 | Krueger | | 717/116 |
| 7,890,923 B2* | 2/2011 | Elaasar | | 717/106 |
| 7,934,193 B2* | 4/2011 | Rojer | | 717/106 |
| 8,060,864 B1* | 11/2011 | Michelsen | | 717/126 |
| 8,069,437 B2* | 11/2011 | Aigner et al. | | 717/106 |
| 8,225,307 B2* | 7/2012 | Baker et al. | | 717/174 |
| 8,281,026 B2* | 10/2012 | Lankford et al. | | 709/231 |
| 8,631,041 B2* | 1/2014 | King et al. | | 707/796 |
| 2004/0172618 A1* | 9/2004 | Marvin | | 717/116 |
| 2005/0050537 A1* | 3/2005 | Thompson et al. | | 717/116 |
| 2005/0066306 A1* | 3/2005 | Diab | | 717/108 |

(Continued)

OTHER PUBLICATIONS

Noga, et al., "Lazy XML Processing", 2002 ACM; [retrieved on Feb. 7, 2014]; Retrieved from Internet <URL: http://dl.acm.org/citation.cfm?id=585075>;pp. 88-94.*

(Continued)

*Primary Examiner* — Xi D Chen
(74) *Attorney, Agent, or Firm* — Kevin Sullivan; Aaron Hoff; Micky Minhas

(57) ABSTRACT

A namespace-based static metadata model is projected into a dynamic programming environment. A dynamic object is created for each static namespace. The host environment populates the dynamic object with a top-level namespace of the static namespace. The dynamic objects are defined such that a request for a member a member of the namespace lazily populates the static metadata into a projected sub-namespace object or a projected type object.

17 Claims, 4 Drawing Sheets

(56) References Cited

U.S. PATENT DOCUMENTS

| | | | | |
|---|---|---|---|---|
| 2005/0108632 | A1* | 5/2005 | Friedman et al. | 715/513 |
| 2005/0108702 | A1* | 5/2005 | Baker et al. | 717/168 |
| 2005/0125720 | A1* | 6/2005 | Little et al. | 715/513 |
| 2006/0288353 | A1* | 12/2006 | King et al. | 719/331 |
| 2007/0294704 | A1* | 12/2007 | Stephen et al. | 719/315 |
| 2008/0098018 | A1* | 4/2008 | King et al. | 707/101 |
| 2010/0083277 | A1* | 4/2010 | Malladi et al. | 719/313 |
| 2012/0174063 | A1* | 7/2012 | O'Carroll et al. | 717/116 |
| 2012/0311536 | A1* | 12/2012 | Fanning et al. | 717/123 |

OTHER PUBLICATIONS

Schott, Noga, "Lazy XSL Trnasformation", 2003 ACM; [retrieved on Feb. 7, 2014]; Retrieved from Internet <URL: http://dl.acm.org/citation.cfm?id=958224>;pp. 9-18.*

Schmoelzer, et al., "Reflextive, Model-based Data Access with the Type-safe Entity Container"; 2006 IEEE; [retrieved on Feb. 7, 2015]; Retrieved from Internet <URL:http://ieeexplore.ieee.org/stamp/stamp.jsp?tp=&arnumber=4020147>;pp. 1-4.*

Bartzas, et al., "Enabling Run-Time Memory Data Transfer Optimizations at the System Level with Automated Extraction of Embedded Software Metadata Information"; 2008 IEEE;[retrieved on Feb. 7, 2015]; Retrieved from Internet <URL:http://ieeexplore.ieee.org/stamp/stamp.jsp?tp=&arnumber=4482990>;pp. 234-241.*

Kerne, et al., "Meta-Metadata: A Metadata Semantics Language for Collection Representation Applications"; 2010 ACM; [retrieved on Feb. 7, 2015]; Retrieved from Internet <URL:http://dl.acm.org/citation.cfm?id=1871437.1871580>;pp. 1129-1138.*

Guerra, et al., "Architectural Patterns for Metadata-based Frameworks Usage"; 2010 ACM; retrieved on Feb. 7, 2015; Retrieved from Internet <URL:http://dl.acm.org/citation.cfm?id=2493288.2493292>;pp. 1-25.*

Scharli, Nathanael., "Supporting Pure Composition by Inter-language Bridging on the Meta-level" Retrieved at, <<http://scg.unibe.ch/archive/masters/Scha01a.pdf>>, Sep. 2001, pp. 109.

"Advanced MEF Programming", Retrieved at <<http://www.pmg.lcs.mit.edu/~chandra/publications/oopsla03.pdf>>, Feb. 6, 2011, pp. 5.

* cited by examiner

POPULATION OF DYNAMIC OBJECTS REPRESENTING STATIC NAMESPACE HIERARCHIES

BACKGROUND

Dynamic programming environments provide developers with convenient and flexible techniques in authoring programs (e.g., heterogeneous use of types, extreme polymorphism, duck typing, and prototypal inheritance). Dynamic programming environments can include the use of dynamic objects, which expose members such as properties and methods at run time instead of at compile time. This enables developers to create objects to work with structures that do not match a static type or format. Dynamic programming environments run scripts to provide the fastest possible execution of common programs, and use various combinations of techniques and strategies to accomplish convenience and flexibility.

Static metadata used to describe functionality can be projected into a dynamic programming environment. In one example, the static metadata categorizes functionality into logical namespaces, as can be done using common language runtime metadata, or other common metadata systems. Namespaces are often arranged in hierarchies including top-level namespaces and type objects. A namespace hierarchy can optionally include one or more sub-namespaces between the top-level namespace and the type objects.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to projecting a namespace-based static metadata model into a dynamic programming environment. A dynamic object is created for each static namespace. The host environment populates the dynamic object with a top-level namespace of the static namespace. The dynamic objects are defined such that a request for a member of the namespace lazily populates the static metadata into a projected sub-namespace object or a projected type object. This supports introspection. In one example, host environment populates the dynamic object automatically at the application startup, which is relatively less expensive in terms of overhead than attempting to populate an entire static metadata tree at application startup. The remaining cost of projecting the static model can be deferred until later during the dynamic application runtime and in such a manner as not to overwhelm the dynamic runtime environment with high amounts of overhead. In one example, the host environment initially populates a single root namespace object for each namespace and then the object will lazily create child namespaces, types, and members as these are referenced.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
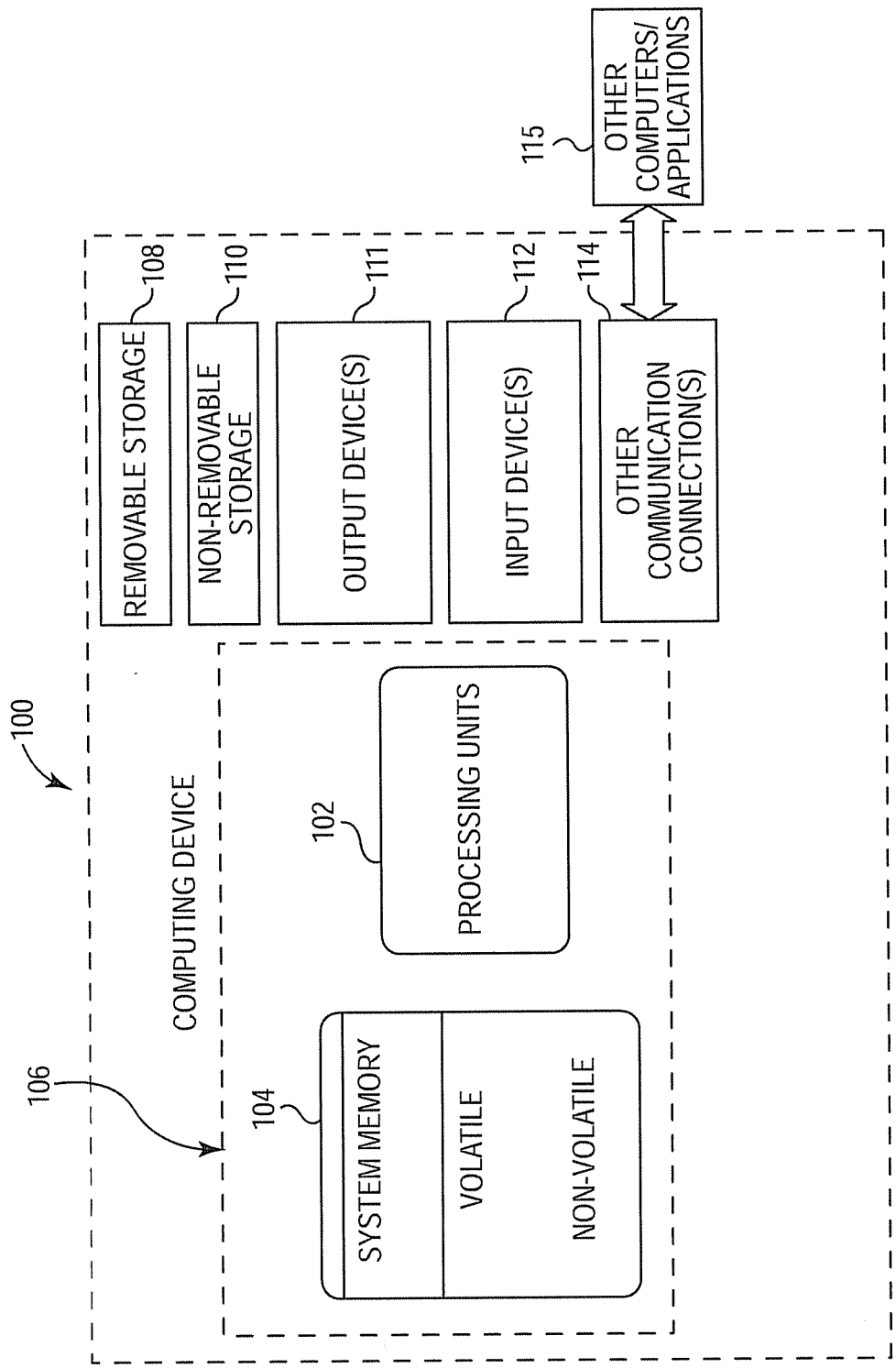
FIG. 1 is a block diagram illustrating an example computing device that can implement a dynamic programming environment.

FIG. 1 illustrates an exemplary computer system that can be employed as an operating environment that includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. The managed environment typically includes a virtual machine that allows the software applications to run in the managed environment so that the developers need not consider the capabilities of the specific processors 102. Particular current examples of managed environment frameworks or platforms include that sold under the trade designation of .NET Framework from Microsoft Corp. of Redmond, Wash., United States, and Java from Sun Microsystems, Inc. of Santa Clara, Calif., United States, as well as others.

To enable the runtime environment to provide service to the managed code, language compilers emit metadata that describes, among other things, the types in the code. A "data type," or "type system," is generally a tractable syntactic framework for classifying phrases according to the kinds of values they compute. Many programming languages explicitly include the notion of "data types" and "type systems" although different languages may include different terminology to describe these features. A data type is an attribute of corresponding data that describes some features about the data. For example, data types are used to define data as memory addresses, instruction code, integers, floating point numbers, strings, and other forms of data used in a given language and other features such as legal values for the data and allowable operations on the values. A data type is metadata for the corresponding data. A type gives meaning to data because hardware of the computing device 100 does not make a distinction between memory addresses, instruction code, integers, floating point numbers, and the like.

The computing device 100 can be coupled to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Figure 2:
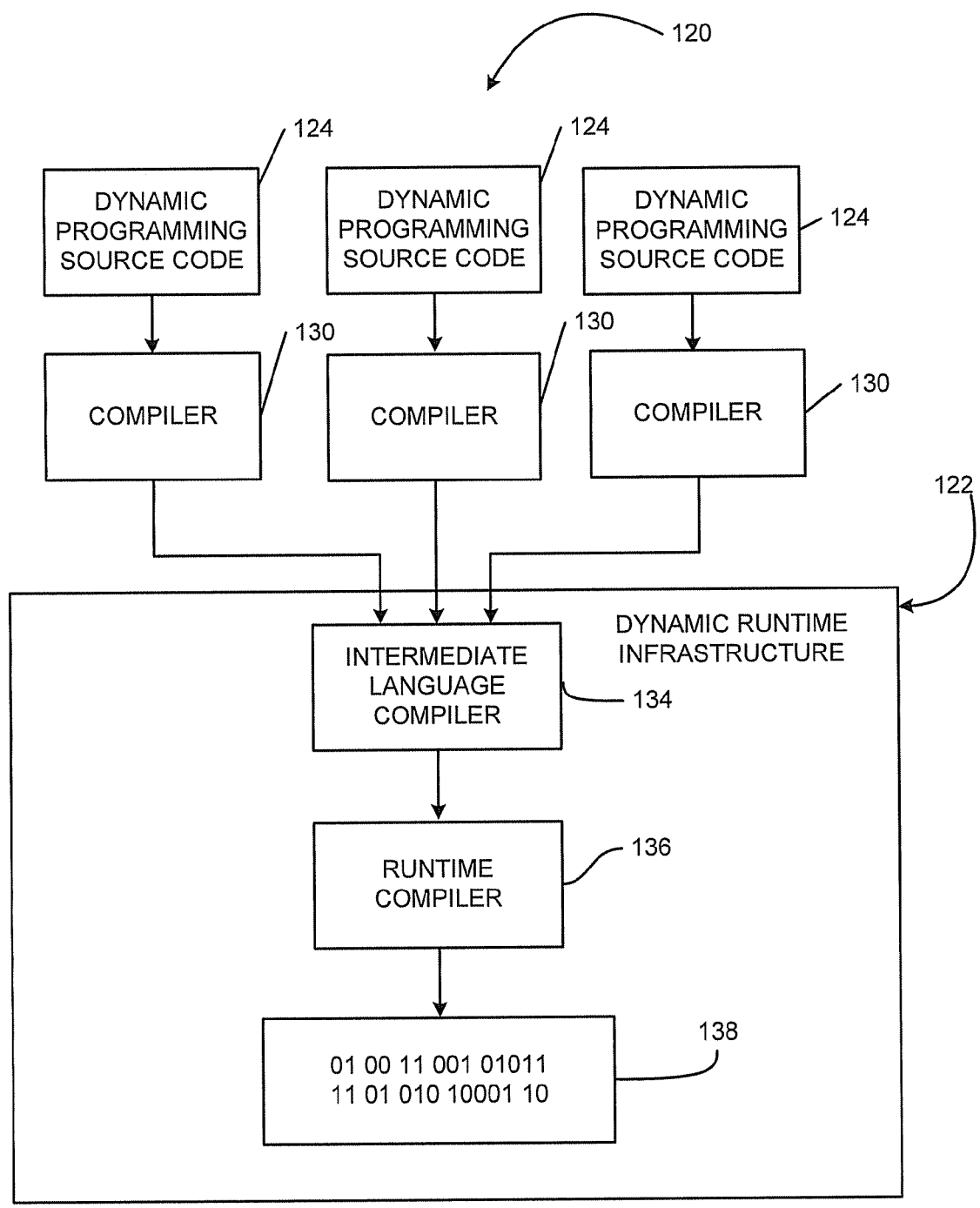
FIG. 2 is a block diagram illustrating an example embodiment of a dynamic programming environment.

FIG. 2 illustrates an example embodiment of a dynamic programming environment 120 suitable for operation with a computing device, such as the computing device 100. The dynamic programming environment 120 includes a dynamic runtime infrastructure 122 for one or more dynamic programming languages. The dynamic programming environment 120 is configured to accept programs written in a compatible source code 124 of one or more dynamic programming languages. One or more compilers 130 in dynamic programming environment 120 are configured to compile each dynamic programming source code 124 into a corresponding compatible object code. The object code is provided to dynamic runtime infrastructure 122 that describes an executable code and a dynamic runtime environment that describes a number of dynamic runtimes. Dynamic runtime infrastructure 122 includes a second compiler 134 that receives the compatible object code and compiles the object code to a second and platform-neutral intermediate language. The intermediate language is provided to a runtime compiler 136, that compiles the intermediate language into a machine readable code 138 that can be executed on the current platform or computing device, such as computing device 100.

Certain systems—such as a web browser, a game, and an operating system application—use large amounts of static metadata to describe functionality, and the static metadata are projected into a dynamic programming environment. In one example, the static metadata categorizes functionality into logical namespaces, and each logical namespace can include one or more sub-namespaces using common language runtime metadata or other common metadata systems.

When projecting a large namespace-based static metadata model into a dynamic programming environment namespaces and other information can be realized as objects in the dynamic programming environment. This allows introspection, which is a capability to determine the type of an object at runtime (and can be used to implement polymorphism) and to determine runtime values. The use of objects to realize namespaces can facilitate discoverability through partitioning the projected static metadata into components. When there is a large amount of this metadata, however, the time and space requirements to populate an entire static namespace hierarchy, or tree, of namespace and sub-namespace objects, and their children, may be prohibitive for scripted programming environments because of the high amount of overhead used to perform this task.

Figure 3:
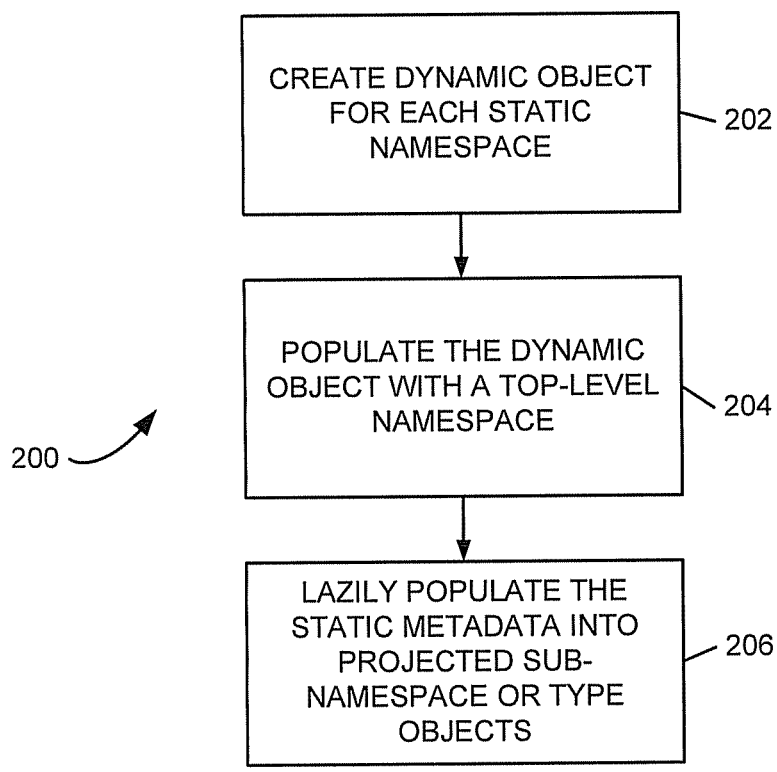
FIG. 3 is a flow diagram illustrating an example of a method implemented in a dynamic runtime infrastructure that populates dynamic objects representing static namespace hierarchies.

FIG. 3 illustrates a method 200 that enables "lazy population" of a dynamic object representing a static namespace while maintaining the ability for introspection. Lazy population is a design pattern used to defer initialization of an object until a later point such as when it will be used. For example, lazy population can be triggered by various events such as the passage of time, idle periods in processing, certain operations, and other events. A dynamic object is created for each static namespace at 202. Initially, the host environment creates a small set of dynamic objects for top-level namespaces in the static metadata at 204. The dynamic objects are defined such that requests for their members lazily populate the static metadata into projected sub-namespace or type objects at 206.

The projection of the static metadata into the dynamic environment represents static namespace as dynamic objects. The host provides the dynamic objects in the dynamic environment with a small set of top-level namespaces from the static metadata at 204. Top-level namespaces can include a single root namespace object. In one example, these dynamic objects are projected automatically at the application startup, which is relatively less expensive in terms of overhead than attempting to populate the entire tree at application startup. The remaining cost of projecting the static model can be deferred until later during the dynamic application runtime at 206 and in such a manner as not to overwhelm the dynamic runtime environment with high amounts of overhead. In one example, the object will lazily create child namespaces, types, and members as these are referenced.

In one example, the remaining static model is projected in pieces, i.e., elements of the static metadata, during selected events at 206 so as not to overwhelm the dynamic runtime environment with high amounts of overhead. One selected event that can trigger lazy population is whenever the application explores the members of the namespace objects. Operations that include knowing whether a member is present will refer to static metadata. Such operations can include "GetOwnProperty", "HasProperty", "Put", "Delete" and "DefineOwnProperty," which are invoked on the dynamic object. Dynamic objects can be lazily populated with the referred to static metadata. As the application refers to more static metadata, the tree of namespace objects will become further populated. These operations may or may not be constrained to cases where the operation knows the name of the member it wants to know about. When this is the case, the fully qualified name is used to lookup the associated metadata. In one example, this operation is performed such that at most one new file of metadata are loaded and interpreted per member resolution. In most cases, however, merely pockets of functionality from the large set of metadata will be used in a single session, which significantly reduces the total amount of metadata to be read.

This method allows for the projection of static namespaces into dynamic objects to allow introspection. In cases where large amounts of static metadata are used to describe functionality, the dynamic objects are loaded with limited amounts of static metadata to allow the script to function without overwhelming the scripted programming environments. Thus, metadata is projected as it is used to defer costs rather than use large amounts of system resources up front.

There can also be cases, such as enumerating the properties of an object, where the name of the desired property is not known. This can either be disallowed, by constraining the representation of the namespace object to be a non-enumerable object, or it can be enabled by constraining the representation of the metadata to allow for fast access to the full metadata associated with the direct members of a namespace. In one example, the metadata files can be arranged such that namespaces are directly represented in the file system—for example, a namespace NS1.NS2 can be found in metadata files of the form NS1.NS2.metadata or NS1.NS2.*.metadata. This allows for the metadata to be found using the file system, without having to load and interpret irrelevant metadata files.

Figure 4:
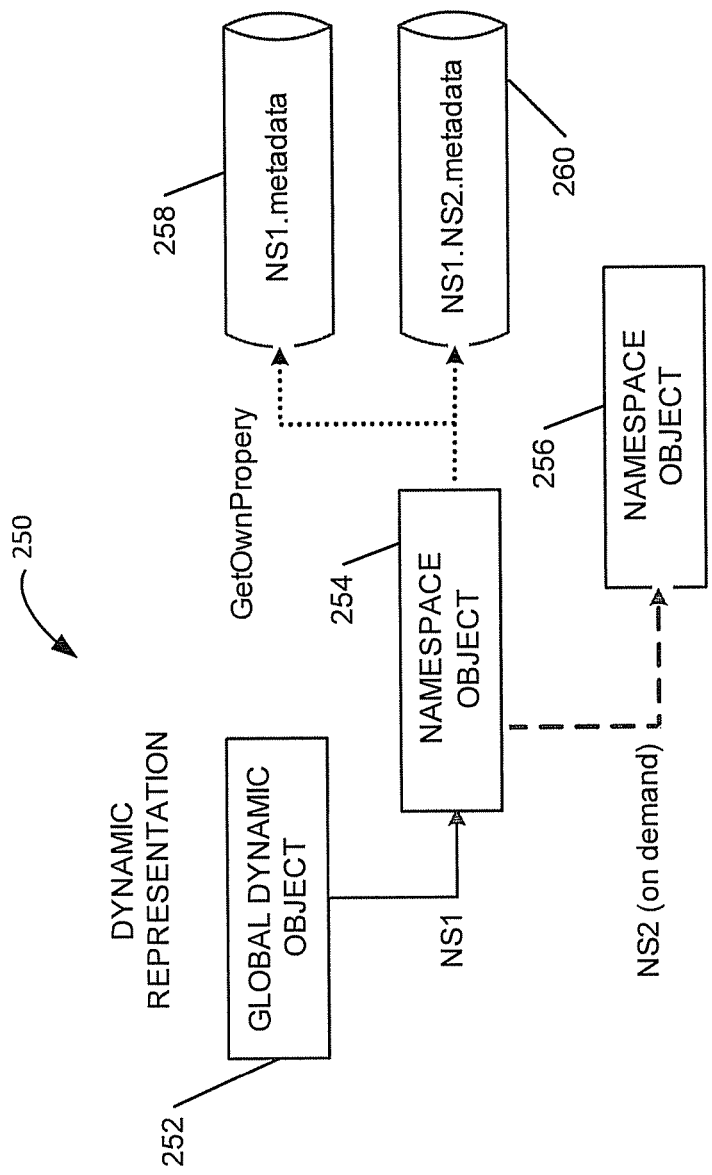
FIG. 4 is a schematic diagram illustrating an example dynamic representation of static metadata that can be created with a method such as the example method illustrated in FIG. 3.

FIG. 4 illustrates an example dynamic representation of static metadata 250. Example static metadata can include File "NS1.metadata": namespace NS1 {type T1;} and File "NS1.NS2.metadata": namespace NS1 {Namespace NS2 {type T2; type T3;}}. The dynamic representation of the static metadata 250 can include a global dynamic object 252 referencing a namespace dynamic object 254 such as NS1. This corresponds with the method 200 wherein the host environment initially creates a small set of namespace objects at 204. As the developer explores the members of the namespace dynamic object 254, such as with the GetOwnProperty operation, the example static metadata is lazily populated into projected sub-namespace object NS2 256 or type objects such as NS1.metadata 258 and NS1.NS2.metadata 260.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computing device implemented method in a dynamic programming environment, the method comprising:
    creating a plurality of dynamic objects to represent each of a plurality of static metadata categorized as a plurality of hierarchical static namespaces in the dynamic programming environment;
    projecting the static metadata into the dynamic programming environment including populating each of the plurality of dynamic objects initially with a top-level namespace of the hierarchical static namespaces; and
    defining the dynamic objects such that a request for a lower member of the hierarchical namespaces is deferred and the static metadata is lazily populated into a projected sub-namespace object or a projected type object.

2. The method of claim 1 wherein the dynamic programming environment includes a dynamic runtime infrastructure.

3. The method of claim 1 wherein the static metadata includes common language runtime metadata.

4. The method of claim 1 wherein the top-level namespace is populated at application startup.

5. The method of claim 1 wherein the namespace realized in the dynamic object supports introspection.

6. The method of claim 5 wherein the introspection is used to implement polymorphism.

7. The method of claim 1 wherein the hierarchy includes the top-level namespace followed by the sub-level namespace followed by a type.

8. The method of claim 7 wherein the hierarchy includes a plurality of sub-level namespaces.

9. The method of claim 1 wherein the request for members includes operations invoked on the dynamic object.

10. The method of claim 9 wherein the operation is constrained to cases where the operation knows a name of the member.

11. The method of claim 10 wherein the operation knows whether a member is present in the dynamic object.

12. A computer readable storage medium, which is not a transitory propagating signal, storing computer executable instructions for controlling a computing device to perform a method comprising:
    creating a plurality of dynamic objects to represent each of a plurality of static metadata categorized as a plurality of hierarchical static namespaces in a dynamic programming environment;
    projecting the static metadata into the dynamic programming environment including populating each of the plurality of dynamic objects initially with a top-level namespace of the hierarchical static namespaces; and
    defining the dynamic objects such that a request for a lower member of the hierarchical namespaces is deferred and the static metadata is lazily populated into a projected sub-namespace or a projected type object.

13. The computer readable storage medium of claim 12 wherein the method is included in a platform.

14. The computer readable storage medium of claim 12 wherein the defining the dynamic object is performed when an application explore members of the namespace while the member is dynamically explored.

15. The computer readable storage medium of claim 14 wherein the member is explored when operations are invoked.

16. The computer readable storage medium of claim 15 wherein the operations are selected from a group consisting of: GetOwnProperty, HasProperty, Put, Delete, and DefineOwnProperty included in a platform.

17. A computer readable storage medium, which is not a transitory propagating signal, storing a dynamic runtime infrastructure including computer-executable instructions for controlling a computing device to perform a method comprising:
- creating a plurality of dynamic objects to represent each of a plurality of static metadata categorized as a plurality of hierarchical static namespaces in a dynamic programming environment;
- projecting the static metadata into the dynamic programming environment including populating each of the plurality of dynamic objects initially with a top-level namespace of the hierarchical static namespaces wherein each top-level static namespace corresponds with one of the plurality of dynamic objects; and
- defining the dynamic objects such that a request for a lower member of the hierarchical namespaces while a dynamic object of the plurality of dynamic objects is explored, wherein the request for the lower member of the hierarchical namespaces is deferred and the static metadata is lazily populated into a projected sub-namespace object or a type object after populating the dynamic objects with the top-level namespaces.

* * * * *